(12) United States Patent
Dynarski et al.

(10) Patent No.: US 8,274,994 B2
(45) Date of Patent: Sep. 25, 2012

(54) METHODS AND APPARATUS FOR COMMUNICATING USING A GATEWAY COMMUNICATIONS DEVICE HAVING ALERT GENERATION CAPABILITY

(75) Inventors: Richard Dynarski, Freehold, NJ (US); Vladimir Parizhsky, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 12/487,805

(22) Filed: Jun. 19, 2009

(65) Prior Publication Data

US 2010/0322258 A1 Dec. 23, 2010

(51) Int. Cl.
*H04J 3/22* (2006.01)
*H04M 1/00* (2006.01)
*G06F 15/16* (2006.01)

(52) U.S. Cl. ............... 370/466; 455/553.1; 709/249
(58) Field of Classification Search .............. None
See application file for complete search history.

(56) References Cited

U.S. PATENT DOCUMENTS

| | | | |
|---|---|---|---|
| 7,200,397 B1 * | 4/2007 | Jones et al. ............ | 370/331 |
| 7,293,110 B2 * | 11/2007 | Dowling .............. | 709/249 |
| 7,835,384 B2 * | 11/2010 | Furuskar et al. ......... | 370/445 |
| 8,103,278 B2 * | 1/2012 | Tsao .................. | 370/331 |
| 2001/0014911 A1 * | 8/2001 | Doi et al. ............. | 709/221 |
| 2003/0161288 A1 * | 8/2003 | Unruh ................ | 370/338 |
| 2004/0014474 A1 * | 1/2004 | Kanada ............... | 455/444 |
| 2004/0128310 A1 * | 7/2004 | Zmudzinski et al. ..... | 707/102 |
| 2004/0264436 A1 * | 12/2004 | Hassan et al. .......... | 370/351 |
| 2005/0008002 A1 * | 1/2005 | Kubler et al. .......... | 370/352 |
| 2005/0037751 A1 * | 2/2005 | Kim et al. ............. | 455/432.1 |
| 2005/0190768 A1 * | 9/2005 | Cutler ................ | 370/395.2 |
| 2006/0087993 A1 * | 4/2006 | Sengupta et al. ........ | 370/310 |
| 2006/0133414 A1 * | 6/2006 | Luoma et al. .......... | 370/466 |
| 2006/0209744 A1 * | 9/2006 | Tischer ............... | 370/328 |
| 2011/0060777 A1 * | 3/2011 | Van De Poel .......... | 707/827 |

OTHER PUBLICATIONS

International Search Report and Written Opinion—PCT/US2010/039272, ISA/EPO—Nov. 19, 2010.

* cited by examiner

*Primary Examiner* — Timothy J Weidner
(74) *Attorney, Agent, or Firm* — James O'Hare; Paul S. Holdaway

(57) ABSTRACT

Methods and a gateway apparatus for facilitating communication between communications devices which support different communications protocols are described. The gateway device may receive an identifier of interest from a first device which supports a first communications protocol but not a second communications protocol. The gateway monitors signals corresponding to the second communications protocol to detect signals corresponding to the identifier of interest. An externally perceivable alert is generated by the gateway device when a signal corresponding to the identifier of interest is detected. Communications is established between the first communications device and a second communications device with the gateway device performing protocol conversion to the extent required. The first device may power down its interface after sending the identifier of interest to the gateway and then power up the interface in response to sensing of the alert or input from a user responding to the alert.

16 Claims, 5 Drawing Sheets

METHODS AND APPARATUS FOR COMMUNICATING USING A GATEWAY COMMUNICATIONS DEVICE HAVING ALERT GENERATION CAPABILITY

FIELD

Various embodiments relate to wireless communications, and more particularly, to methods and apparatus which support communications between different communications devices, e.g., via one or more gateway communications devices.

BACKGROUND

Individuals may often use one or more communications devices, e.g., cell phones, personal data assistants, notebook computers, which often support one or more communications protocols. Such devices often include an interface corresponding to each supported communications protocol, e.g., a CDMA interface for cellular communications, a Bluetooth interface for Bluetooth communications, a USB interface for connection via a USB cable to another device, etc.

While devices may include one or more communications interfaces, as new protocols and/or standards are developed it would be desirable to be able to interact with an existing device, e.g., cell phone, PDA or other device, through one of its existing interfaces. While applications, e.g., software, may be readily loaded onto an existing device, it is not feasible in many cases to replace an existing communications interface or add an additional physical communications interface to support one or more protocols which were not originally supported by a device at the time it was originally deployed.

In view of the difficulty in adding new physical interfaces to existing or deployed devices, in the case of mobile devices, power consumption is often an issue. To conserve power in a mobile communications device it is often desirable to power down an interface when the device does not perceive a need to use the interface. In a powered down state, an interface may not be able to receive or process signals. While some protocols support a mechanism for waking up or reactivating the interface by supplying a particular external signal to the interface, in many cases this is not the case and the interface needs to be powered up, e.g., activated, by the device, e.g., in response to an internal signal or a user provided input, e.g., pressing a button or touching another control input on the device.

In view of the above discussion, it should be appreciated that there is a need for methods and/or apparatus which would allow a communications device, e.g., a mobile communications device, to interact with devices supporting one or more protocols not supported by an interface included in the communications device. It would be desirable if in at least some embodiments, interaction with devices which support a protocol not supported by the communications device could be achieved without requiring an interface being added to the communications device. It would also be desirable if, in at least some embodiments, methods and apparatus allowed a device to power down an interface when it was not being used for communication with another device.

SUMMARY

Methods for facilitating communication or networking between communications devices which support a variety of communication technologies, e.g., communications protocols, are described. In various embodiments one or more gateway communications devices, are used thereby allowing a communications device which does not include an interface which supports a particular protocol to interact and communicate with devices which do support the particular protocol. The particular protocol may be, e.g., a peer to peer protocol or other communications protocol for which the communications device lacks an interface supporting the protocol.

In accordance with one aspect, the proposed methods allow an existing wired and/or wireless communications device to communicate with and/or obtain services from devices in a peer to peer communications network or other network for which the communications device does not include an interface. Advantageously, in accordance with at least some embodiments, this interoperability is achieved without the need to modify and/or change a device to add an additional physical interface. Thus, as will be described below, a communications device including one or more interfaces may interact with a gateway device implemented in accordance with at least one aspect, and through the gateway device interact, e.g., communicate with or receive services from, one or more devices which use one or more protocols that are not supported by a physical interface on the communications device.

In accordance with one exemplary aspect, an exemplary method of operating a gateway communications device comprises: receiving on a first interface which supports a first communications protocol an identifier from a first communications device; receiving a signal on a second interface which supports a second communications protocol, the second communications protocol being different from the first communications protocol; determining if the received signal matches the identifier; and generating an externally perceivable alert, e.g., an audio, vibratory, or visual alert, when it is determined that the received signal matches the identifier. The identifier may, and in some embodiments does, correspond to a device, peer or service identifier of interest to a device that supplies the identifier to the gateway. The first interface may be an interface which supports a protocol, e.g., a Bluetooth, a WiFi, a USB, a CDMA or other communications protocol while the second communications protocol may be a peer to peer communications protocol or another protocol which is not supported by an interface on the device which supplied the identifier. The externally perceivable alert notifies a user and/or the device which supplied the identifier to the first interface of the detection of a signal corresponding to the identifier. This allows the user of the device supplying the identifier to the first interface to take an action to wake up or otherwise activate an interface on the device supplying the identifier so that it can interact with the gateway, e.g., and thereby communicate via the gateway with the device from which the signal detected on the second interface was received or to which the signal corresponds. In cases where a user is involved in activating or otherwise powering up the interface on the device which sent the identifier to the first interface of the gateway in response to the externally perceivable alert, the interface on the device which sent the identifier to the gateway can be completely powered down or put into an inactive state after sending the identifier thereby allowing the sending device to conserve power even though the protocol supported by the first interface may, and in some but not all embodiments, does not allow the gateway device to directly control the power up of the interface on the first device or otherwise reactivate the interface on the device which sent the identifier to the first interface.

In accordance with various aspects, it should be appreciated that a match between the identifier supplied to the first interface may be a precise match, a probabilistically determined match (where some but not necessarily all bits might match) or a match may be determined based on a predetermined relationship between the first identifier and a value communicated in a received signal. For example, a match between the first identifier and a signal received on the second interface may be determined when the signal received on the second interface communicates a value which matches a value generated from the first identifier in a predetermined manner, e.g., using a predetermined hash function where, in some embodiments time or another varying input is used as an input to the hash function in addition to the first value.

In various embodiments, the gateway device serves not only to perform protocol conversions between signals received and transmitted on different gateway interfaces but also as a proxy for a device coupled to the gateway, e.g., by monitoring for signals communicated using a protocol not supported by the device and alerting the device when a signal of interest is detected.

In one exemplary embodiment, but not necessarily all embodiments, a gateway communications device includes at least one processor configured to: receive on a first interface which supports a first communications protocol an identifier from a first communications device; receive a signal on a second interface which supports a second communications protocol, the second communications protocol being different from the first communications protocol; determine if the received signal matches the identifier; and generate an externally perceivable alert when it is determined that the received signal matches the identifier. The gateway communications device may, and in some embodiments does, include a memory coupled to said at least one processor. The gateway device may be implemented as a portable device capable of being held in a hand, worn on a belt or placed in a pocket. In some but not necessarily all embodiments the gateway device includes an independent power supply, e.g., battery, separate from any power supply or battery used by devices which communicate with the gateway device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
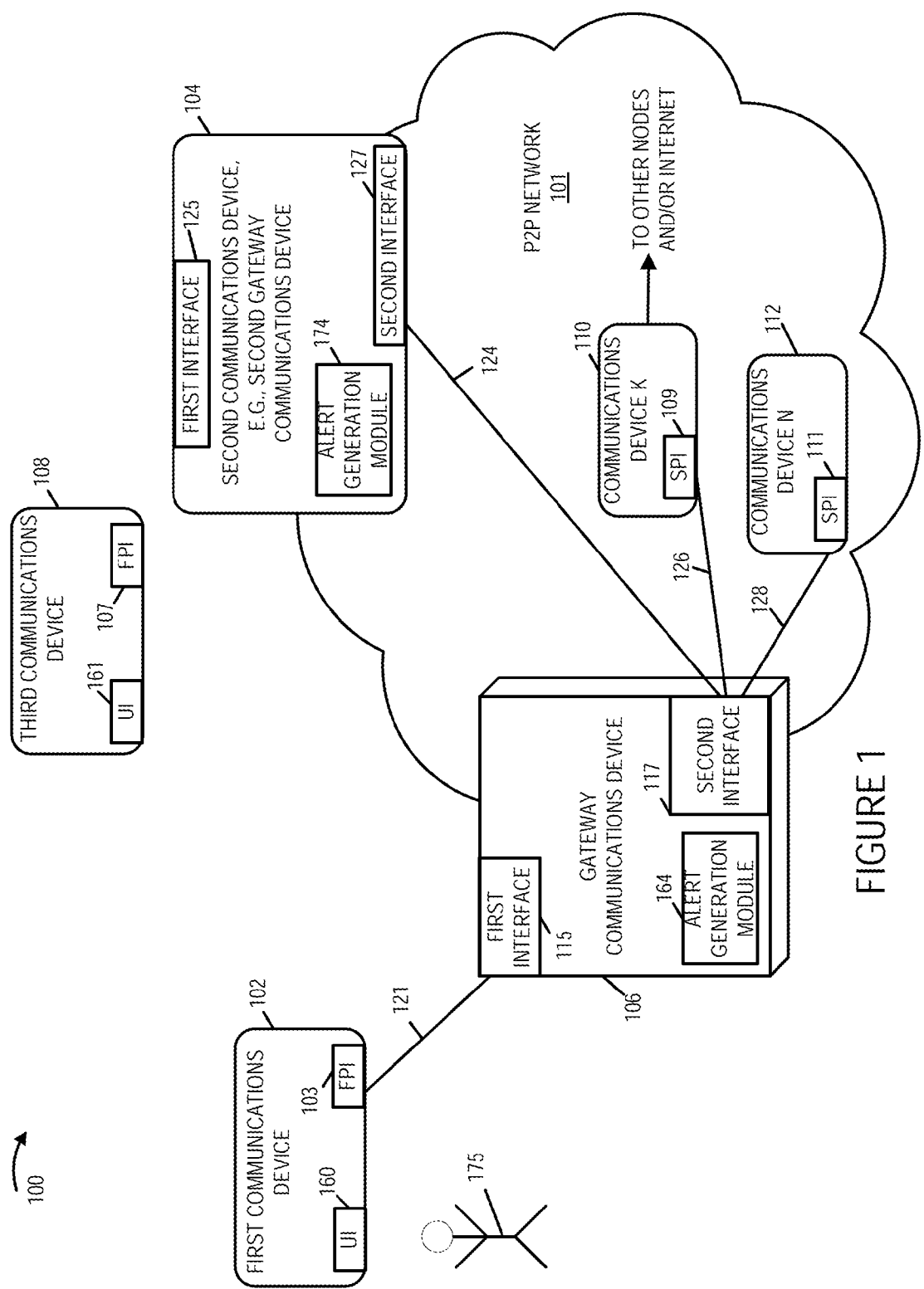
FIG. 1 illustrates an exemplary wireless communications system, in accordance with one exemplary embodiment.

FIG. 1 illustrates an exemplary wireless communications system, in accordance with one exemplary embodiment. Exemplary communications system 100 includes a plurality of communications devices 102, 104, 106, 108, 110, 112. The plurality of communications devices includes devices which can operate as end nodes, e.g., communications peers, such as, e.g., first communications device 102, third communications device 108, and Nth communications device 112. Communications devices 104 and 106 are implemented as communications gateways to facilitate communication between devices in the system 100 which support different communications protocols and which absent the aid of a gateway device might not be able to interact.

In some but not necessarily all embodiments communications devices 102, 108 are implemented as portable communications devices or wireless terminals such as cell phones or portable personal data assistant (PDA) devices. Communications device 102, 108 may operate as end nodes and may support one or more communications protocols. For example, first and third communications devices 102, 108 include a first protocol interface (FPI) 103, 107 which supports a first communications protocol. Communications devices 102, 108 can receive and send signals via the first protocol interfaces 103, 107 respectively. In some embodiments interfaces 103, 107 are wireless interfaces which include receiver and/or transmitter modules for receiving and/or transmitting signals. The first and third communications devices 102, 108 also include user interfaces (UI) 160, 161 which can receive input from a human user and generate human perceivable signals. The UI 160, 161 can include a keypad, touch screen, switch or other input device which can be used to wake-up, power on, or otherwise activate or change the operating state of the particular communications device 102, 108 in which the user interface 160, 161 is located. Both the first and third communications devices 102, 108 may, but need not be, cellular communications devices. First and third communications devices may belong to, e.g., the same or different cellular networks.

The first communications protocol may be any one of a variety of communications protocols, e.g., a wireless communications protocol such as a CDMA protocol, Bluetooth, or WiFi protocol such as 802.11. However, it may also be a USB, Ethernet or other wired protocol.

While the first and third communications devices 102, 108 support the first communications protocol, other communications devices, e.g., communications device K 110 and communications device N 112 support and use a second communications protocol, e.g., a peer to peer or some other communications protocol, which is different from the first communications protocol. In the FIG. 1 example communications devices 110, 112 are part of a peer to peer communications network 101 in which peer to peer communications signals are used to communicate without the involvement of a centralized network controller to control communications resource allocation. In the FIG. 1 example, first and third communications devices 102, 108 are not part of the peer to peer communications network 101 to which devices 110, 112 belong.

Communications devices K 110 and N 112 may operate as end nodes and support communications using the second communications protocol. In order to support communications via the second communications protocol, communications devices 110, 112 include and use second protocol interfaces 109, 111 respectively. Communications device K 110 may have a connection, e.g., a wired or fiber network connection, to other nodes and/or the Internet and can provide such connectivity to other devices 104, 106, 112 which can communicate with communications device K 110. However, such a connection is optional.

For discussion purposes, it should be appreciated that in the exemplary embodiment the second communications protocol is not compliant with the first communications protocol. In some but not all embodiments, devices 110, 112 use a different frequency band for the second communications protocol than a frequency band used by devices 102, 108 for implementing the first communications protocol. Thus, communications devices 102, 108 supporting the first protocol can not directly interact with communications devices 110, 112 which support the second communications protocol but not the first.

As discussed above, the second communications protocol is described as a peer to peer communications protocol, in one exemplary embodiment used to explain various aspects. However, it should be appreciated that this is not the case in all embodiments and that the more notable thing is simply that the first and second communications protocols are different and that devices which support only the first communications protocol can not directly interact with devices which support only the second communications protocol in a meaningful way.

The first communications device 102 may power down the first protocol interface 103 during a sleep mode of operation, when the device 102 is powered down, and/or in response to a period of inactivity on the communications link 121. In such a powered down state, the first protocol interface 103 may not be able to receive, detect or process signals.

It should be appreciated that at least in some embodiments, the first communications device 102 and gateway communications device 106 are separate communications devices implemented in separate housings but which are linked by a wired or wireless communications link 121.

The gateway communications devices 104, 106 each include a first interface 115, 125, respectively, which supports the first communications protocol. In addition, the gateway communication devices 104, 106 also each include a second interface 117, 127 which supports the second communications protocol. Gateway communications devices 104, 106 are capable of receiving signals on either of the first and second interfaces, performing a protocol conversion operation to the extent necessary, and then outputting the received signal on the same interface it was received or on one of the first and second interfaces on which the signal was not received. Thus, gateway communications devices 104, 106 are capable of acting as an interface between networks and/or devices using the first and second protocols. The protocol conversion and routing may be transparent to the end devices 102, 108, 110, 112.

In FIG. 1, human being 175 represents a human user who may be a user of the first communications device 102 and who may also be a user of gateway communication device 106. In some embodiments, both the first communications device 102 and gateway communications device 106 are implemented as portable wireless communications devices, e.g., handheld devices, which can be carried by the user 175, e.g., in a hand, on a belt and/or in a pocket. Thus, gateway communications devices 104, 106 may be portable communications devices, e.g., which can be worn on a belt for example, or stationary communications devices.

In some other embodiments, the gateway communications devices 104, 106 have the ability to wake up the devices 102, 108 via the first interface. However, in many embodiments gateway communications devices 104, 106 do not have the ability to wake up or otherwise activate devices in sleep or a power off mode via the first interfaces 115, 125. The inability of the gateway communications devices 104, 106 to wake up devices 102, 104 via the first interface may be due, e.g., to the communications devices 102, 108 ceasing to monitor for signals received via the communications protocols and/or frequency bands utilized by the first interfaces for communication, e.g., wireless communication.

In accordance with one aspect an alert generation module 164, 174 is incorporated into the gateway devices 106, 104, respectively. The alert generation modules 164, 174 are capable of generating a perceivable alert, e.g., an audible signal, vibration or visual indicator which can be used to alert a user of the gateway device 106 or an input on the first device 102, in response to detection of a signal or identifier. The user 175, in response to detecting an alert from the gateway 106 can check the state of the first communications device 102 and change the state, e.g., wakeup the device or power on the first protocol interface 103, if necessary, so that the first device 102 is in a state whereby it can receive signals from the gateway communications device 106.

In some embodiments, generation of a human perceivable alert by the gateway communications device 106 will occur whenever an alert trigger condition is detected such as receipt of signal matching an identifier specified by the first communications device, on the second interface 117 of the gateway communications device. However, in other embodiments generation of the human perceivable alert depends on whether or not the first protocol interface 103 is active and ready to receive signals from the gateway communications device 106 at the time the alert trigger condition is detected, e.g., as a result of a received signal matching an identifier previously received by the gateway communications device 106 via the first interface 115. In such an embodiment, the perceivable alert is generated if the first protocol interface 103 is active and ready to receive signals from the gateway communications device but not when it is ready to receive and respond to signals. In this manner, the human user 175 is not disturbed unnecessarily but will be alerted when the first communications device 102 should be activated or a state change manually triggered by the user so that the gateway communications device 106 can then interact with the first communications device 102 via the first protocol interface 103 of the first communications device 102.

While the alerting of the user 175 by the gateway device 106 may seem undesirable, it allows the gateway communications device 106 to enable interaction with a wide range of devices including many standard cell phones and/or other devices without requiring hardware changes to the devices and/or interface upgrades. In addition, it allows the first device 102 to be shielded from the complexities of communicating with devices using protocols which are not directly supported by the first communications device 102.

Figure 2:
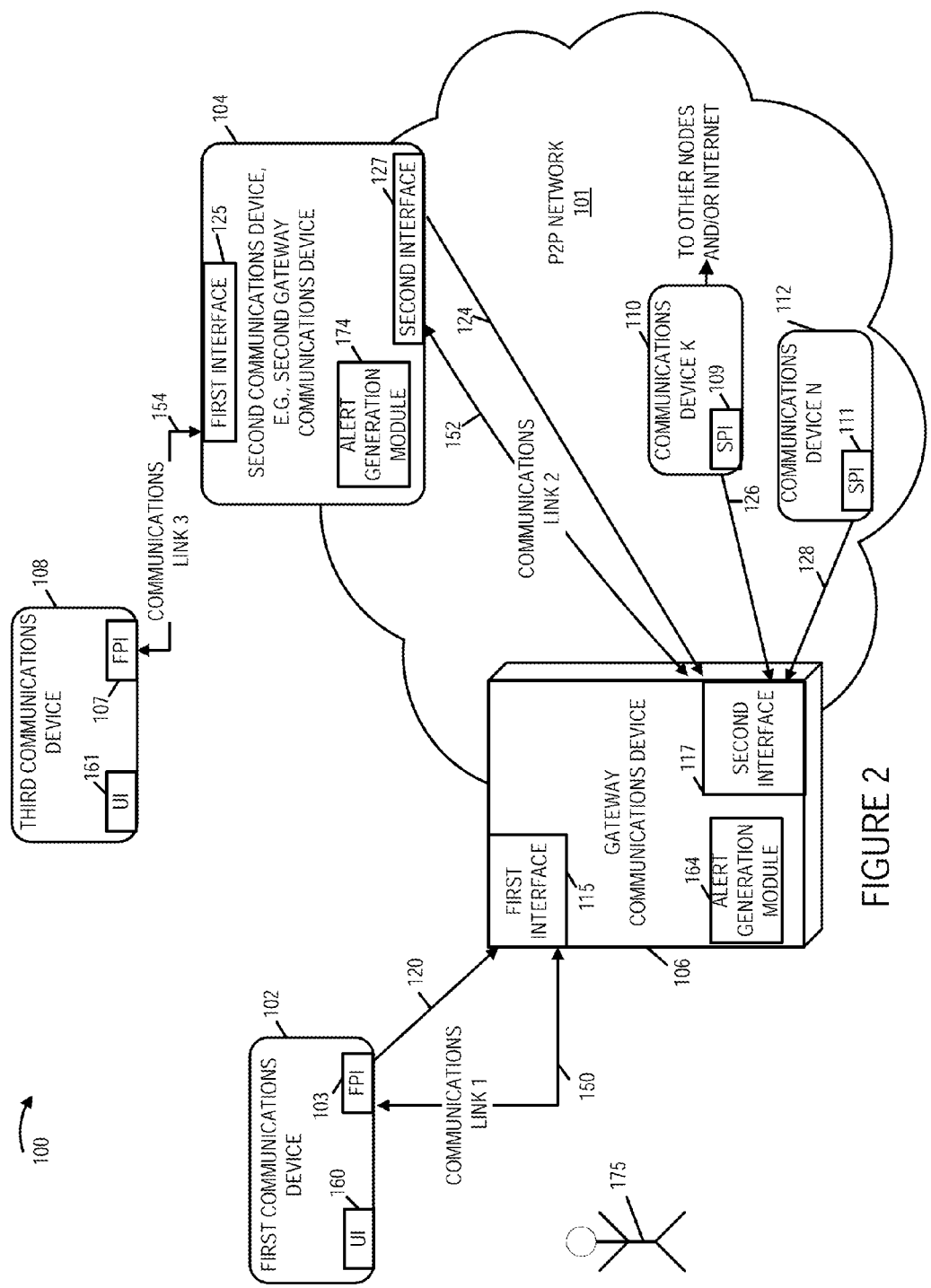
FIG. 2 illustrates exemplary signaling and communications between various devices of communications system shown in FIG. 1, in accordance with one exemplary embodiment.

Various embodiments, features and methods will now be discussed in greater detail with reference to FIG. 2. FIG. 2 illustrates exemplary signaling and communications between various devices of communications system 100, in accordance with one example in which an identifier is received by the gateway communications device 106 via interface 115 and the gateway device 106 then monitors for received signals which match the received identifier.

In accordance with one exemplary embodiment, the first communications device 102 is looking for or wishes to find some application, service or item, e.g., device, which is identified by a particular identifier, referred to as an identifier of interest. The identifier of interest can be used by the gateway device 106 to detect signals, received on the second interface 117 or another interface of the gateway device 106, which correspond to, e.g., match, the identifier of interest.

In accordance with one aspect the first device 102 communicates the identifier of interest to the gateway device 106 in signal 120 via the first protocol interface 103 and use of the first communications protocol. After communication of the identifier of interest, to save power or for other reasons, the first communications device 102, may, and often does power down the first protocol interface 103. Once powered down, the first communications device will not be able to receive signals via the first interface 103 or process signals transmitted to the interface 103. To enable such receipt and/or processing, the interface 103 must be powered back up, e.g., in response to a user or other control signal.

After receiving the identifier of interest on the first interface 115 the gateway communications device 106 proceeds to monitor to detect signals corresponding to the identifier of interest, regardless of the interface on which they may be received. While the gateway 106 may continue to monitor for signals on the first interface, in some but not all embodiments, after a period of inactivity on the first interface or according to a predetermined schedule, it powers down the first interface 115 to conserve power.

The gateway 106 monitors signals corresponding to the second communications protocol, received on the second interface 117 for signals corresponding to the received identifier of interest as well as signals which may be received on the first interface. Monitoring for signals corresponding to the identifier of interest may include monitoring, e.g., in peer discovery intervals, for one or more signals corresponding to the identifier of interest. Thus, the gateway communications device 106 monitors for discovery or other signals from other peer devices to check if any peer communications device in the network 101 within range of the gateway 106 is advertising or offering the application and/or service, identified by the received identifier, sought by the first communications device 102. The gateway communications device 106 receives one or more signals, e.g., 124, 126 and 128, on the second interface 117 from different communications devices 104, 110, 112 and determines if any of these signals correspond to, e.g., match, the identifier of interest.

In one embodiment, if a match between a received signal, e.g., 124, and the identifier of interest is detected, the alert generation module 164 in the gateway device 106, generates an externally perceivable alert, e.g., an audible, visual or vibratory alert. In various embodiments the alert can be detected by the human user 175 or in some cases by a sensor or interface other than the first protocol interface 103, on the first device 102. In response to the alert, in embodiments where the first device does not sense the alert, the user 175 activates or otherwise controls the first communications device 102, via user interface 160, to power on or otherwise enter a state in which the first protocol interface 103 is active and can receive and process signals. In embodiments where a sensor or interface, e.g., on the first device 102, detects the alert, the first device power up the first protocol interface 103 in response to detecting the alert. In addition to generating the alert, if the first interface 115 was powered down and is not in a powered on state at the time the match to the previously received identifier is determined, the first interface 115 is powered up in response to the determination of a match between the identifier and the received signal.

Once the interface 103 on the first device is active, the gateway communications device 106 can interact with the first device 102 via the interface 103. As part of the process, following generation of the alert, the gateway communications device 106 establishes a communications link, e.g., link 150 with the first communications device.

In some but not all embodiments, prior to generating the user perceivable alert, the gateway device 106 checks to determine if it has an active, e.g., functional, link with the first communications device 102. For example, a functional link may exist because of another alert which was generated or because the first communications device 102 initiated communication with the gateway device 106 via the first protocol interface 103 for another reason, e.g., a data transmission or ongoing communications session. In some embodiments where such a link is present at the time a signal corresponding to the identifier of interest is detected, the externally perceivable alert and link establishment process are skipped and the gateway communications device 106 proceeds to using the existing communications link. The gateway communications device 106 uses the existing or established communications link 150 to provide information to the first communications device relating to the detection of a signal corresponding to the identifier of interest, e.g., information such as the detected signal, information about the device from which the signal was received, or which was the original source of the detected signal. The communicated information may include information identifying a device, e.g., the third communications device 108 which may be contacted to obtain a service of interest, e.g., in the case where the identifier of interest corresponds to a service being sought by the first device 102.

In the FIG. 2 example, the gateway device 106 establishes a second communications link, e.g., Link 2 152, with the device 104 that transmitted the signal 124 which matches the identifier 120. Signal 124 may have been transmitted on behalf of another device 108 which may have been the source of the content of signal 124. Once the communication links are established, the first and second communications devices 102, 104 can communicate with each other and traffic and/or other data can be exchanged. The second communications device 104, when operating as a gateway may serve to relay communications and perform protocol conversion on relayed communications to the extent necessary. Accordingly, the second device 104 in some embodiments may act as a link in a communications connection extending between the first communications device 102 and the third communications device 108 which is created in response to the first communications device 102 being made aware of the service advertised in the P2P network 101 via signal 124.

In the FIG. 2 example, the second communications device 104 is, e.g., a second gateway communication device, and has a communications link 3 154 with the third communications device 108 and thereby supports communications between the first communications device 102 and the third communications device 108. In such a case, traffic data and/or signals can and in some embodiments are, routed through the gateway communications devices 106, 104.

Figure 3:
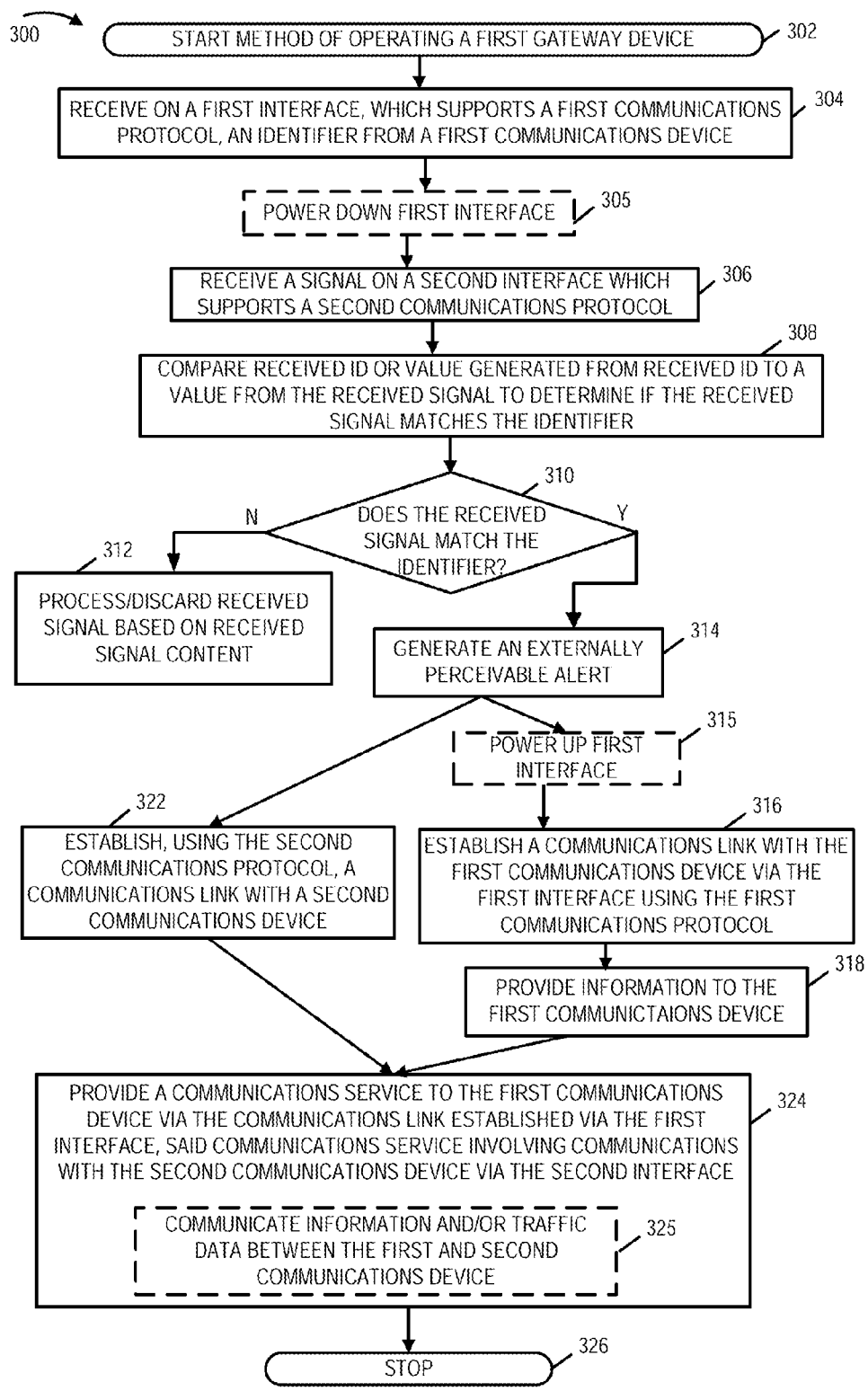
FIG. 3 is a flowchart of an exemplary communications method in accordance with one exemplary embodiment.

While an exemplary embodiment has been used to describe various features, the method used in some embodiments will become even clearer when considered in view of the flow chart shown in FIG. 3.

FIG. 3 is a flowchart 300 illustrating the steps of an exemplary communications method, in accordance with one exemplary embodiment. In some embodiments the exemplary communications method is implemented by a gateway communications device 106 of communications system 100, shown in FIG. 1.

Operation starts in step 302 where the gateway communications device 106 is powered on and initialized. Operation proceeds from the start step 302 to step 304. In step 304 the gateway communications device 106 receives an identifier, e.g., 120, on the first interface 115 which supports a first communications protocol, from a first communications device, e.g., device 102. In some embodiments the identifier is one of a service identifier, an application identifier, a device identifier, a user identifier a location identifier and a group identifier which is of interest to the first device 102. In some embodiments the first interface 115 is, e.g., Ethernet, 802.11, Universal serial bus (USB), Bluetooth etc., and the first interface 115 supports a corresponding communications protocol depending on the type of the first interface 115. Consider an example where the first device 102 is, e.g., a gaming console, and the user of device 102 seeks to search for, e.g., a game application, service or a gaming partner to interact with. The user sends the identifier of interest 120 corresponding to the game application, service or partner being sought, to the gateway device 106 on the first interface using the first communications protocol. In some embodiments in order to save power the first protocol interface 103 in the first communications device 102 is powered down after the identifier 120 is communicated thereby making it unreachable by the first interface 115 of the gateway 106 until it is powered up again.

In some but not all embodiments, optional step 305 is implemented. In optional step 305 the first interface 115 of gateway device 106 is powered down after the identifier 120 is received, e.g., due to inactivity and/or according to a schedule thereby allowing the gateway 106 to conserve power.

In step 306, the gateway communications device 106 receives a signal, e.g., signal 124, on the second interface 117 which supports a second communications protocol, the second communications protocol being different from the first communications protocol. In some embodiments the second interface is a peer to peer interface and the second protocol is a peer to peer protocol.

Operation proceeds from step 306 to step 308. In step 308 the gateway communications device 106 compares the received identifier 120 or a value generated from the received identifier to a value, e.g., set of bits, obtained from the received signal 124 to determine if the received signal matches the identifier. As discussed above, the value generated from the received identifier 120 may be the output of a hash function which uses the identifier 120 and time or another time varying signal as an input to generate an identifier which is expected to be used to advertise the item of interest at a particular point in time. In some embodiments the match determination may be a probabilistic determination which can result in a match being declared even if the identifier 120 or the value generated from the identifier 120 does not precisely match the signal 124 on a bit by bit basis. The use of a probabilistic determination may be desirable where signals received on the second interface 117 may have been subject to errors due to wireless transmission or other communications problems. However in some other embodiments the determination may be an exact match determination. The exact match determination approach provides a higher degree of certainty for taking further actions, e.g., generating an alert.

Operation proceeds from step 308 to step 310 wherein a decision as to what processing path should be followed is made based on whether or not step 308 determined a match between the identifier of interest received via the first interface 115 and the signal received via the second interface 117.

If the received signal does not match the received identifier of interest, operation proceeds from step 310 to step 312 in which the received signal is subjected to further processing and/or is discarded. The gateway device 106 will continue to monitor for signals with the receipt of an additional signal on the second interface resulting in processing resuming from step 308 and the additional received signal being checked to determine if it matches the received identifier of interest.

If a match between the received signal and identifier of interest was determined in step 308 operation proceeds from step 310 to step 314. In step 314, an externally perceivable alert is generated thereby notifying at least one of a user of i) the first communications device 102 and/or the gateway communications device 106 and ii) the first communications device 102 that a signal matching the identifiers of interest was detected. The generated alert may be, e.g., an audible alert, visual alert such as a flashing light or other detectable alert such as a vibration of the gateway device 106. In some embodiments, the gateway device 106 includes at least one of a speaker, light or led, and a vibrator for generating the alert.

In those embodiments where the first interface 115 on the gateway 106 is in a powered down mode when the alert is generated, in step 315 the first interface 115 is powered up. Step 315 is optional and not needed in embodiments where the gateway does not power down the first interface 115.

In response to the generated alert, a user may become aware of the detected signal and respond to the alert by controlling the first communications device 102 through a user interface 160 to power up the first protocol interface 103. Alternatively another interface on the first communications device, e.g., a microphone which is part of the user interface 160, may detect the alert. In response to the user input or the detection of the alert via an interface other than the first protocol interface 103, the first communications device 102 will power up the first communications protocol interface 103 thereby enabling it to receive and communicate once again with the first interface 115 of the gateway communications device 106.

Operation proceeds from step 315 in those embodiments where it is implemented, or directly from step 314 in those embodiments where step 315 is not implemented, to step 316. In step 316 a communications link is established with the first communications device 102 via the first protocol interface 103. The communications link is established using the first communications protocol. Thus, as shown in the FIG. 2 example, the gateway communications device 106 may establish the communications link 1 150. Operation proceeds from step 316 to step 318. In step 318 the gateway communications device 106 communicates information to the first communications device 102, e.g., relating to the signal detected on the second interface, information identifying the source of the signal or other information relating to the service or application available from the device advertising the second signal. The operation proceeds from step 318 to step 324.

The gateway device 106 establishes a communications link with a second communications device, e.g., the device from which the signal matching the identifier of interest was received, in step 322. This may occur prior to, in parallel with, or subsequent to establishment of the communications link with the first communications device.

Operation proceeds from step 322 to step 324. Thus, by the time step 324 is performed, the gateway has established a communications link 150 with the first device 102 and a communications link 152 with the second communications device 104, e.g., using the first and second protocols, respectively.

Returning to step 324. In step 324 a communications service is provided to the first communications device 102 via the communications link established via the first interface, said communications service involving communications with the second communications device via the second interface. The gateway communications device 106 having established communications links with both the first and second communications devices 102, 104, provides a communications service to the first communications device 102 via the communications link established via the first interface 115, e.g., link 1 150, said communications service involving communications with the second communications device 104 via the second interface 117.

The communications service may involve, e.g., bi-directional communications between the first and second communications devices 102, 104 and/or the relaying or communication of information or data between the first communications device 102 and a third communications device 108 by way of the second communications device 104. As part of providing the service the gateway communications device 106, in some embodiments, communicates information and/or traffic data between the first and second communications devices 102, 104 as indicated by reference number 325.

After the service is provided in step 324, the process shown in FIG. 3 stops in step 326 until such time as the gateway device 106 receives another identifier for which it is to monitor. It should be appreciated however, that the gateway device 106 may continue to monitor for signals corresponding to other identifiers of interest and/or service from other communications devices even though the communications link 150 with the first device may be terminated in stop step 326.

In one example in which the method shown in FIG. 3 is used, the first device 102 is looking for Internet access and accordingly communicates an identifier corresponding to an Internet access service to the gateway communications device 106. In such a case and with reference to FIG. 1, gateway communications device 106 discovers that communication device K 110 is, e.g., an access point providing access to the Internet. The gateway communications device 106 sets up communications links between the first device 102 and communications device K 110 and allows the first device 102 to access the Internet via communications device K 110 providing the necessary protocol conversion between the first and second protocols. In this example, the first communications device 102 is provided Internet access via device K 110 but without having to support the second communications protocol used by communications device K 110 to interface with the gateway communications device 106. In addition, the first communications device 102 can power down the first protocol interface 103 and conserve power while waiting for the gateway device 106 to detect a suitable Internet access point through which it can connect to the Internet via gateway device 106. In such an embodiment, Internet access, e.g., Web browsing and/or other Internet access features, are supported via gateway communication device 106 accessing the Internet via the peer to peer communications network 101 which can not be directly accessed by the first communications device 102.

Figure 4:
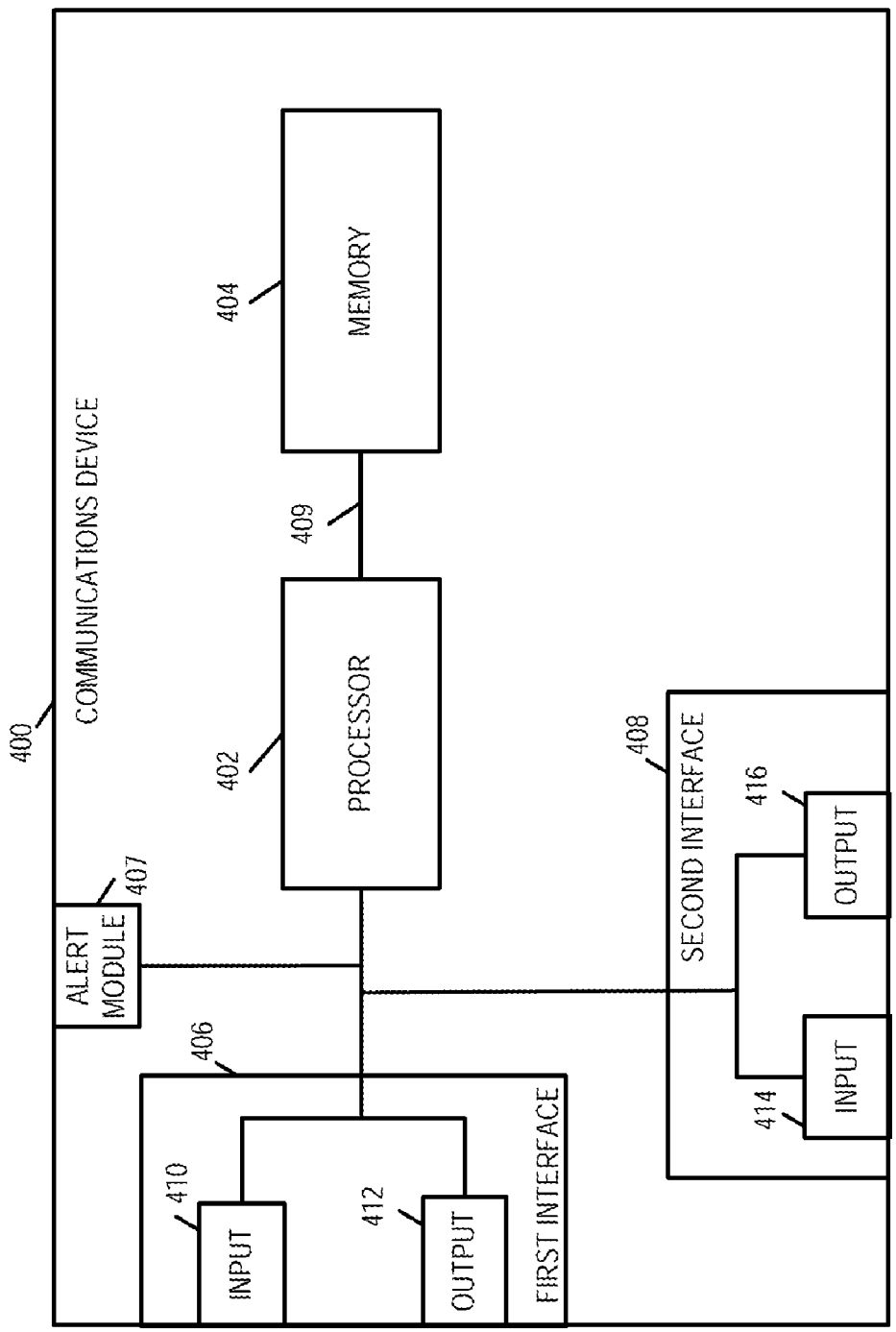
FIG. 4 illustrates an exemplary communications device which can be used in the system of FIG. 1.

FIG. 4 is illustrates an exemplary communications device 400 implemented in accordance with one exemplary embodiment. Communications device 400 may be, and in at least one embodiments is, a gateway communications device which can be used as either of the first or second gateway communications devices 104, 106 shown in FIG. 1. Communications device 400 may, and in some embodiments does implement the steps of the method shown in FIG. 3. Communications device 400 includes a processor 402 and memory 404 coupled together via a bus 409 over which the various elements (402, 404) may exchange data and information. Communications device 400 further includes a first interface 406 and a second interface 408. The first and second interfaces 406, 408 include input and output modules 410, 412 and 414, 416 respectively. The input and output modules 410, 412 of the first interface 406 and 414, 416 of the second interface 408, may be coupled to the processor 402 as shown. Alternatively the interfaces 406, 408 may be implemented as part of the processor 402. Input modules 410 and 414 can receive input signals. Input modules 410, 414 can, and in some embodiments do, include a wireless receiver and/or a wired or optical input interface for receiving input. Output modules 412, 416 may include, and in some embodiments do include, a wireless transmitter and/or a wired or optical output interface for transmitting output signals. In some embodiments the first interface is one of an 802.11, USB, Ethernet, Bluetooth, and 802.X interface while the second interface 408 supports a different protocol than the first interface 406. In some embodiments the second interface is, e.g., a peer to peer interface. In addition to interfaces 406, 408 the device 400 includes an alert module 407 capable of generating an externally perceivable alert such as a light, sound or vibration. Alert module 407 may be part of the processor 402.

Processor 402, in some embodiments, is configured to: receive on a first interface which supports a first communications protocol an identifier from a first communications device; receive a signal on a second interface which supports a second communications protocol, the second communications protocol being different from the first communications protocol; determine if the received signal matches the identifier; and generate an externally perceivable alert when it is determined that the received signal matches the identifier. In some but not all embodiments the first interface is powered down after the identifier is received. In some but not all embodiments the first interface is powered on after determining that a received signal matches the identifier. In some embodiments the identifier is one of a service identifier, an application identifier, a device identifier, a user identifier, a location identifier, and a group identifier.

In some embodiments the processor 402 is further configured to establish, using said second communications protocol, a communications link with a second communications device. The processor 402 is further configured to establish a communication link via the first interface using said first communications protocol with the first communications device.

Processor 402, in some embodiments, is further configured to provide a communications service to the first communications device via the communications link established via the first interface, said communications service involving communications with a second communications device via the second interface. In some embodiments, providing a communications service includes serving as a wireless access point to the first communications device. In some embodiments the second interface is a peer to peer interface. In some embodiments the second communications device is a second gateway communications device providing communications service to a third communications device via said first communications protocol. In some embodiments the communications service supports communications between the first communications device and the third communications device.

Figure 5:
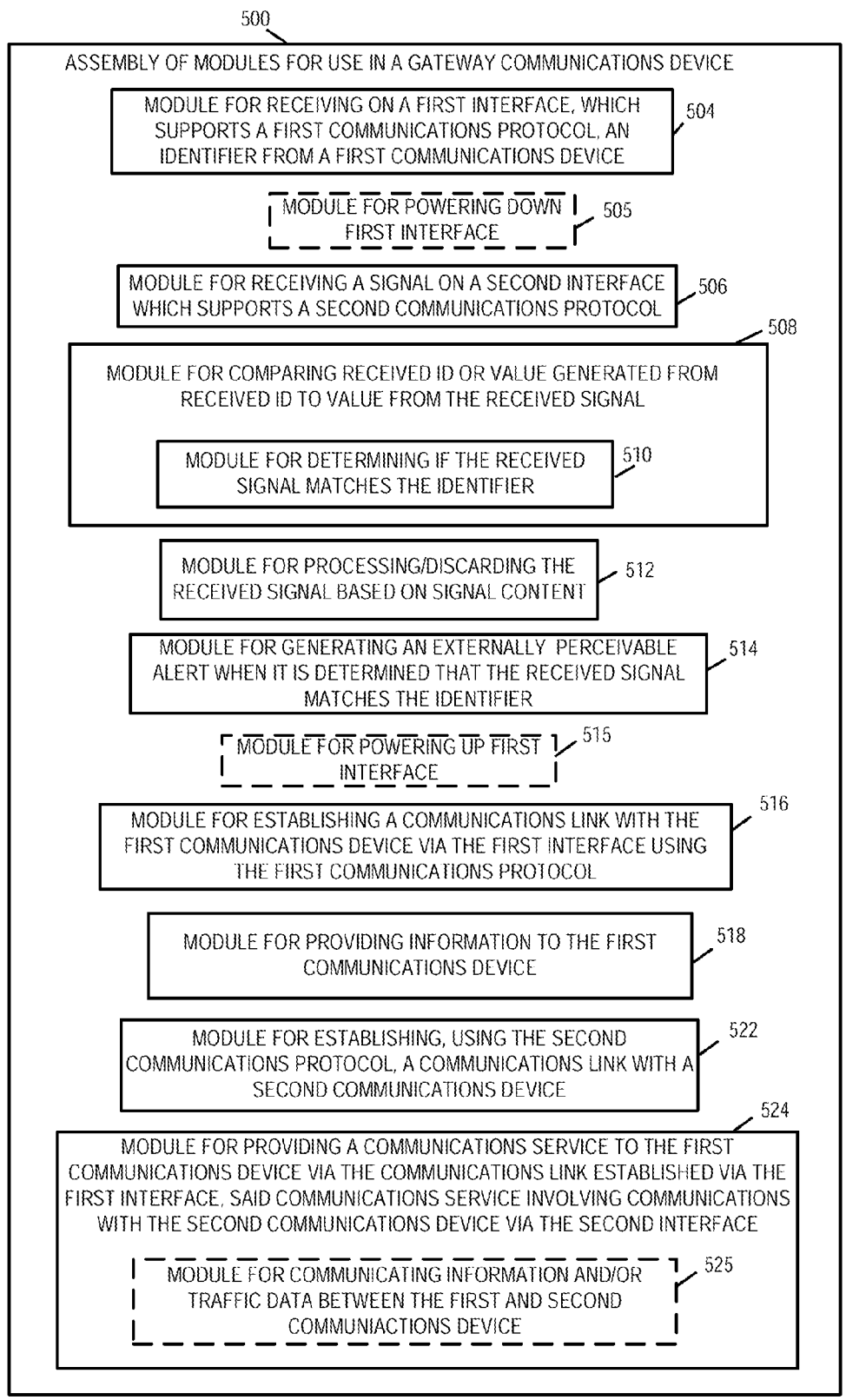
FIG. 5 illustrates an assembly of modules which can be used in the exemplary communications device of FIG. 5.

FIG. 5 is an assembly of modules 500 which can, and in some embodiments are, used in the gateway communications device 400 illustrated in FIG. 4. The modules in the assembly 500 can, and in some embodiments are, implemented in hardware within the processor 402 of FIG. 4, e.g., as circuits. Alternatively, the modules can, and in some embodiments are, implemented in software, e.g., as sets of instructions, and stored in the memory 404 of the communications device 400 shown in FIG. 4. In other embodiments, combinations of software and hardware modules are used. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the communications device 400 or elements therein such as the processor 402, to perform the functions of the corresponding steps illustrated in the method flow chart of FIG. 3.

The assembly of modules 500 includes a module corresponding to each step of the method shown in FIG. 3. The module in FIG. 5 which performs or controls the processor 402 to perform a corresponding step shown in FIG. 3 is identified with a number beginning with a 5 instead of beginning with 3. For example module 504 corresponds to step 304 and is responsible for performing the operation described with regard to step 304. As illustrated in FIG. 5, the assembly of modules 500 includes a module 504 for receiving on a first interface which supports a first communications protocol an identifier from a first communications device, a module 505 for powering down the first interface, a module 506 for receiving a signal on a second interface which supports a second communications protocol, the second communications protocol being different from the first communications protocol, a module 508 for comparing a received ID or value generated from the received ID to a value from the received signal, a module 510 for determining if the received signal matches the identifier, a module 512 for processing/discarding the received signal based on signal content, a module 514 for generating an externally perceivable alert when it is determined that the received signal matches the identifier, and a module 515 for powering up the first interface. In some embodiments the module 510 for determining if the received signal matches the identifier is implemented as a part of module 508. In some embodiments the first interface is one of an 802.11, USB, Ethernet, Bluetooth, 802.X or any other interface. In some embodiments said identifier is one of a service identifier, an application identifier, a device identifier, a user identifier, a location identifier, and a group identifier.

The assembly of modules 500 further includes a module 516 for establishing a communications link with the first communications device via the first interface using the first communications protocol, a module 518 for providing information to the first communications device, a module 522 for establishing, using the second communications protocol, a communications link with a second communications device, and a module 524 for providing a communications service to the first communications device via the communications link established via the first interface, said communications service involving communications with a second communications device via the second interface. In some embodiments module 524 includes an optional module 525 for communicating information and/or traffic data between the first and second communications devices. In some embodiments the communications service may involve bi-directional communications. In some embodiments, providing a communications service includes serving as a wireless access point to the first communications device. In some embodiments the second interface is a peer to peer interface. In some embodiments the second communications device is a second gateway communications device providing communications service to a third communications device via said first communications protocol. In some such embodiments the communications service supports communications between the first communications device and the third communications device.

It should be appreciated that the gateway communications devices of the type described herein are well suited for applications where a large amount of legacy equipment may already exist and there is a need to enable such legacy equipment to communicate with one or more networks implemented using protocols which are not supported by the hardware interfaces of the legacy equipment.

The gateway devices described herein are particularly well suited for first responder and/or other applications where sensor devices and/or other legacy medical or security equipment support protocols which are not supported by more modern communications systems, e.g., ad hoc or peer to peer communications systems. A first responder or medical person can be equipped with a gateway device of the type described herein which could interface with existing sensors and other devices and relay important alerts or information to other devices, e.g., in one or more networks. While minor software updates or software applications may have to be loaded onto the legacy equipment to make it take advantage of the communications capabilities offered by the gateway devices described herein, such software updates can often be implemented at a fraction of the cost of updating a hardware interface on a device. Thus use of the gateway devices allow for a large amount of legacy equipment to continue to be used, albeit in some cases with a minimal amount of input from a user of the equipment to activate an interface, in response to one or more alerts generated by a gateway device.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods discussed above.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links. In some embodiments the gateway devices are implemented as access points which establish communications links with mobile nodes using OFDM and/or CDMA and/or may provide connectivity to the Internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a gateway communications device, the method comprising:
   receiving on a first interface which supports a first communications protocol an identifier from a first communications device;
   powering down said first interface after said identifier is received;
   receiving, while said first interface is powered down, a signal on a second interface which supports a second communications protocol, the second communications protocol being different from the first communications protocol;
   determining if the received signal matches the identifier;
   powering on said first interface after determining that the received signal matches the identifier; and
   generating an externally perceivable alert in response to a determination that the received signal matches the identifier, said externally perceivable alert being one of an audio, vibratory or visual alert.

2. The method of claim 1,
   wherein said gateway communications device is a portable battery powered device.

3. The method of claim 1, further comprising:
   establishing, using said second communications protocol, a communications link with a second communications device.

4. The method of claim 1, further comprising:
   establishing a communication link via the first interface using said first communications protocol with the first communications device.

5. The method of claim 4, further comprising:
   providing a communications service to the first communications device via the communications link established via the first interface, said communications service involving communications with a second communications device via the second interface.

6. The method of claim 5, wherein providing a communications service includes serving as a wireless access point to the first communications device.

7. The method of claim 6, wherein said second interface is a peer to peer interface.

8. The method of claim 7, wherein the second communications device is a second gateway communications device providing communications service to a third communications device via said first communications protocol.

9. The method of claim 8, wherein the communications service supports communications between the first communications device and the third communications device.

10. The method of claim 1, wherein said identifier is one of a service identifier, an application identifier, a device identifier, a user identifier, a location identifier, and a group identifier.

11. A gateway communications device, comprising:
    first receiving means for receiving an identifier from a first communications device, the first receiving means supporting a first communications protocol;
    means for powering down said first receiving means after said identifier is received;
    second receiving means for receiving, while said first receiving means is powered down, a signal, the second receiving means supporting a second communications protocol, the second communications protocol being different from the first communications protocol;
    means for determining if the received signal matches the identifier;

means for powering on said first receiving means after determining that the received signal matches the identifier; and means for generating an externally perceivable alert in response to a determination that the received signal matches the identifier, said externally perceivable alert being one of an audio, vibratory or visual alert.

12. A gateway communications device, comprising:
at least one processor configured to:
  receive on a first interface which supports a first communications protocol an identifier from a first communications device;
  power down said first interface after said identifier is received;
  receive, while said first interface is powered down, a signal on a second interface which supports a second communications protocol, the second communications protocol being different from the first communications protocol;
  determine if the received signal matches the identifier;
  power on said first interface after determining that the received signal matches the identifier; and
  generate an externally perceivable alert in response to a determination that the received signal matches the identifier, said externally perceivable alert being one of an audio, vibratory or visual alert; and
a memory coupled to said at least one processor.

13. The device of claim 12, wherein the at least one processor is further configured to:
  establish, using said second communications protocol, a communications link with a second communications device.

14. The device of claim 12, wherein the at least one processor is further configured to:
  establish a communication link via the first interface using said first communications protocol with the first communications device.

15. The device of claim 12, wherein the at least one processor is further configured to:
  provide a communications service to the first communications device via the communications link established via the first interface, said communications service involving communications with a second communications device via the second interface.

16. A computer program product, for use in a gateway communications device, comprising:
a non-transitory computer readable medium comprising:
  code for causing at least one computer to receive, on a first interface which supports a first communications protocol, an identifier from a first communications device;
  code for causing said at least one computer to power down said first interface after said identifier is received;
  code for causing said at least one computer, while said first interface is powered down, to receive a signal on a second interface which supports a second communications protocol, the second communications protocol being different from the first communications protocol;
  code for causing said at least one computer to determine if the received signal matches the identifier;
  code for causing said at least one computer to power on said first interface after determining that the received signal matches the identifier; and
  code for causing said at least one computer to generate an externally perceivable alert in response to a determination that the received signal matches the identifier, said externally perceivable alert being one of an audio, vibratory or visual alert.

* * * * *